United States Patent
Justice et al.

(10) Patent No.: US 6,996,772 B2
(45) Date of Patent: Feb. 7, 2006

(54) FORMATTING A CONTENT ITEM IN A TEXT FILE USING A DISCRIMINATION STYLESHEET CREATED USING A HEURISTICS STYLESHEET

(75) Inventors: Timothy P. Justice, Corvallis, OR (US); Steven P. Hiebert, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 789 days.

(21) Appl. No.: 09/915,975

(22) Filed: Jul. 25, 2001

(65) Prior Publication Data

US 2003/0023634 A1 Jan. 30, 2003

(51) Int. Cl.
*G06F 7/00* (2006.01)

(52) U.S. Cl. ................ 715/513; 715/522; 715/523
(58) Field of Classification Search ............ 715/513, 715/522–523
See application file for complete search history.

(56) References Cited

U.S. PATENT DOCUMENTS

| | | | | |
|---|---|---|---|---|
| 5,530,852 A | | 6/1996 | Meske, Jr. et al. ......... 709/206 |
| 5,895,465 A | * | 4/1999 | Guha ......................... 707/4 |
| 6,108,651 A | * | 8/2000 | Guha ......................... 707/4 |
| 2001/0056504 A1 | * | 12/2001 | Kuznetsov ............... 709/310 |
| 2002/0049790 A1 | * | 4/2002 | Ricker et al. ............. 707/513 |
| 2002/0073236 A1 | * | 6/2002 | Helgeson et al. ......... 709/246 |
| 2002/0123878 A1 | * | 9/2002 | Menke ......................... 704/2 |
| 2002/0143821 A1 | * | 10/2002 | Jakubowski ............... 707/522 |
| 2003/0007464 A1 | * | 1/2003 | Balani ....................... 370/310 |

FOREIGN PATENT DOCUMENTS

GB 2 339 311 1/2000

OTHER PUBLICATIONS

Royappa, A., Implementing Catalog ClearingHouses With XML And XSL, ACM, 1998.*
"Laura Lemy's Web Workshop Creating Commerical Web pages", Lemay et al, Sams, 1996, pp. 435–439.*
Oronzo Altamura, "Transforming Paper Documents into XML Format with WISDOM++".
"A Method for Generating HTML Documents by Text Data and Format File" Feb. 1999.

* cited by examiner

*Primary Examiner*—Cesar B Paula

(57) ABSTRACT

Various systems and methods are provided to format a content item into a predefined markup format. For example, the various embodiments provide for the transformation of a content item embodied in a text file into a discriminate markup file such as an Extensible Markup Language (XML) file that includes metadata such as tags that differentiate among the various content element in the content item.

10 Claims, 6 Drawing Sheets

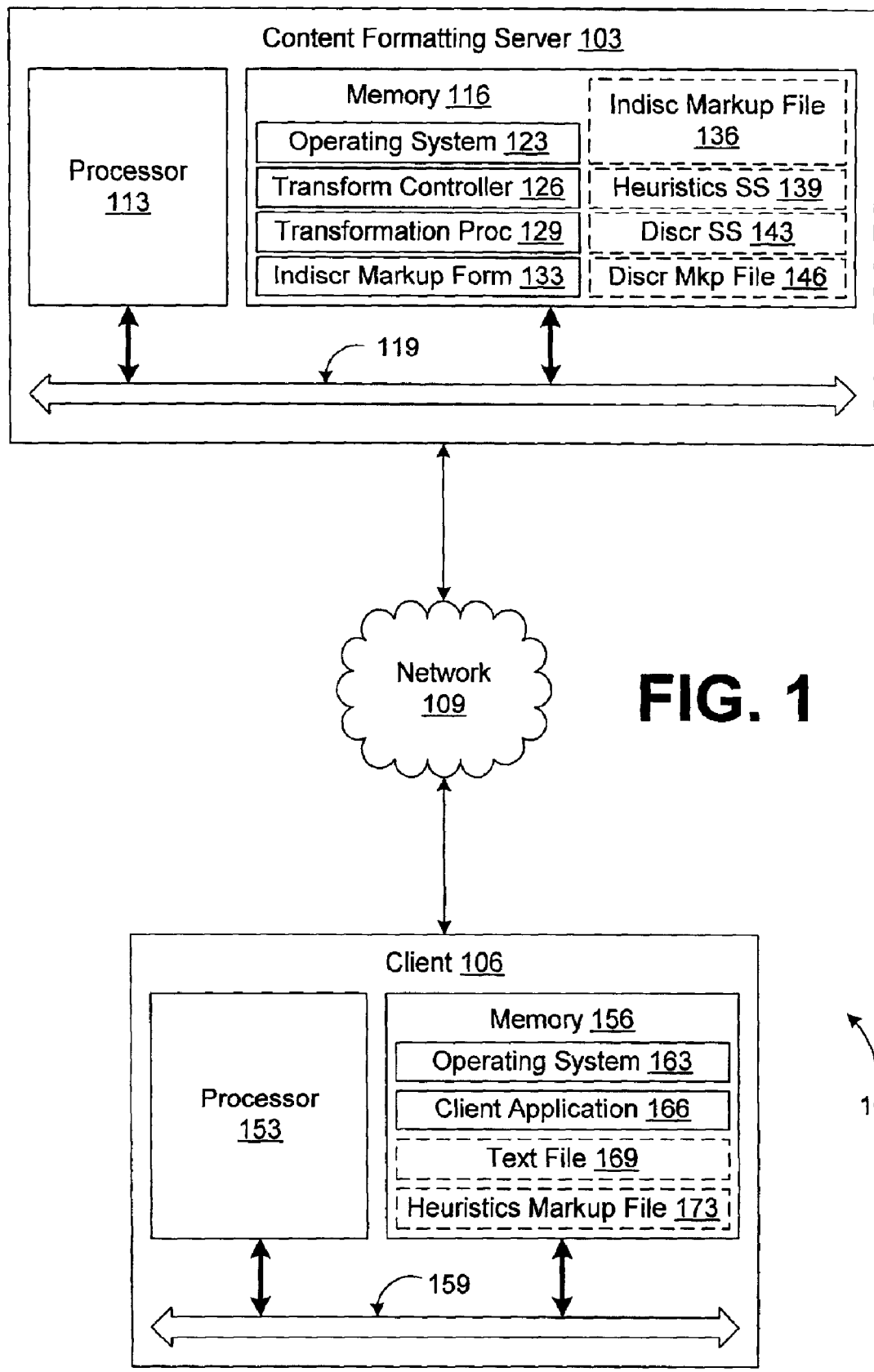

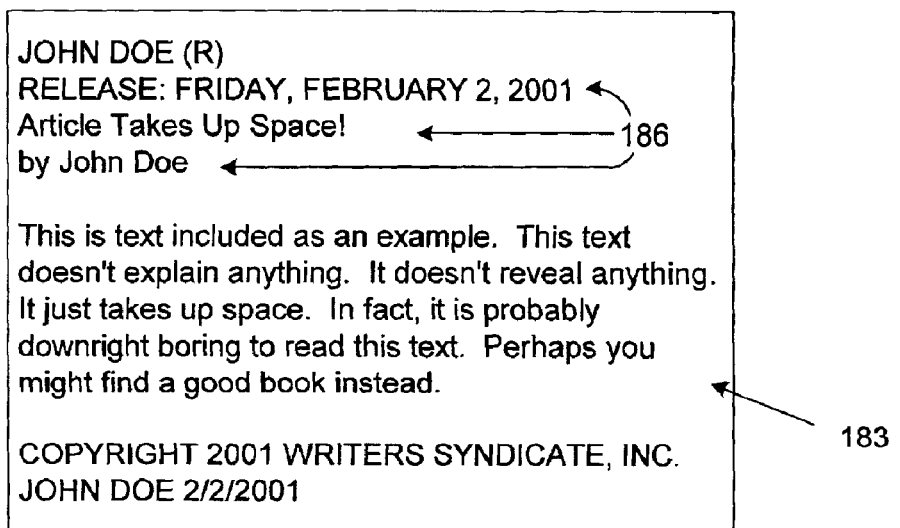

FIG. 2

```
<?xml version="1.0" encoding="utf-8"?>
<nitf>
  <head>
    <title>JOHN DOE (R)</title>
    <docdata>
       <date.release norm="2001-02-02"/>
    </docdata>
  </head>
  <body>
    <body.head>
       <hedline>
          <h1>Article Takes Up Space!</h1>
       </hedline>
       <byline>by John Doe</byline>
    </body.head>
    <body.content>
       <p>This is text included as an example. This text</p>
       <p>doesn't explain anything. It doesn't reveal anything.</p>
       <p>It just takes up space. In fact, it is probably</p>
       <p>downright boring to read this text. Perhaps you</p>
       <p>might find a good book instead.</p>
       <copyrite>COPYRIGHT 2001 WRITERS SYNDICATE, INC.</copyrite>
    </body.content>
  </body>
</nitf>
```

FIG. 3

```xml
<?xml version="1.0"?>

<document>
        <line>"JOHN DOE (R)"</line>
        <line>"RELEASE: FRIDAY, FEBRUARY 2, 2001"</line>
        <line> "Article Takes Up Space!"</line>
        <line> "by John Doe" </line>
        <line> " "</line>
        <line>"This is text included as an example.  This text"</line>
        <line>"doesn't explain anything.  It doesn't reveal anything."</line>
        <line>"It just takes up space.  In fact, it is probably"</line>
        <line>"downright boring to read this text.  Perhaps you"</line>
        <line>" might find a good book instead."</line>
        <line>" "</line>
        <line> "COPYRIGHT 2001 WRITERS SYNDICATE, INC." </line>
        <line> "JOHN DOE 2/2/2001" </line>
<document>
```

FIG. 4

```xml
<heuristics>
        <byline>
                <line>1</line>
        </byline>
        <dateline>
                <line>2</line>
        </dateline>
        <title>
                <line>3</line>
        </title>
        <paragraph>
                <blank type="line"/>
        </paragraph>
        <copyright>
                <line>2nd from bottom</line>
        </copyright>
</heuristics>
```

FIG. 5

FORMATTING A CONTENT ITEM IN A TEXT FILE USING A DISCRIMINATION STYLESHEET CREATED USING A HEURISTICS STYLESHEET

TECHNICAL FIELD

The present invention is generally related to the field of publishing and, more particularly, is related to a system and method for formatting publishing content.

BACKGROUND OF THE INVENTION

In the publishing field, content items in digital form such as news, features, photos, articles, graphics and other items are available for publishing via the Internet and through other services. For example, such content items may be obtained from the Associated Press or other news organizations. Also, many newspapers are becoming national in scope exporting their content to individuals all over the United States via the Internet or other networks.

In order to facilitate transmission of news articles over the Internet and other networks, news publishers have adopted a special digital format to be employed for news articles. This format is called the News Industry Text Format (NITF). The NITF provides a solution for sharing news developed by the world's leading news publishers. NITF uses the Extensible Markup Language (XML) to define the content and structure of news articles using metadata. Because metadata is applied throughout the news content, NITF documents are far more searchable and useful than web pages written in Hypertext Markup Language (HTML) or regular text formats.

By using NITF, publishers can adapt the look, feel, and interactivity of their documents to the bandwidth, devices, and personalized needs of their subscribers. These documents can be translated into HTML, WML (for wireless devices), RTF (for printing), or any other format the publisher wishes. NITF was developed by the International Press Telecommunications Council, an independent international consortium of the world's leading news agencies and publishers. It is a standard that is open, public, proven, well used, well documented, and well supported.

Unfortunately, much of the available content in digital format is not composed using the NITF standard. For example, many news articles are made available in text format or other formats. As a consequence, applications that require articles and the like to conform with NITF cannot process such articles. This presents a problem in that many publishers who create the content items in text file format do not have the technical expertise to generate the content items in NITF or to create stylesheets or other means by which content items are transformed from text files into NITF.

SUMMARY OF THE INVENTION

A method and apparatus that formats a content item converts the content item embodied in a text file into an indiscriminate markup file. The content item that is embodied in the indiscriminate markup file is transformed into a discriminate markup file. This discriminate markup file includes a number of discriminating tags that are associated with a number of content elements.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

FIG. 1 is a block diagram of a client-server network with a content formatting server that is employed to transform a text file into a discriminate markup file;

FIG. 2 is a drawing of a text file to be converted to a discriminate markup file using the content formatting server of FIG. 1;

FIG. 3 is a drawing of a discriminate markup file generated from the text file of FIG. 2 using the content formatting server of FIG. 1;

FIG. 4 is a drawing of an indiscriminate markup file generated by an indiscriminate markup formatter in the content formatting server of FIG. 1;

FIG. 5 is a drawing of a heuristics markup file employed to generate a heuristics stylesheet used to transform the indiscriminate markup file of FIG. 4 into the discriminate markup file of FIG. 3;

DETAILED DESCRIPTION OF THE INVENTION

Figure 6:
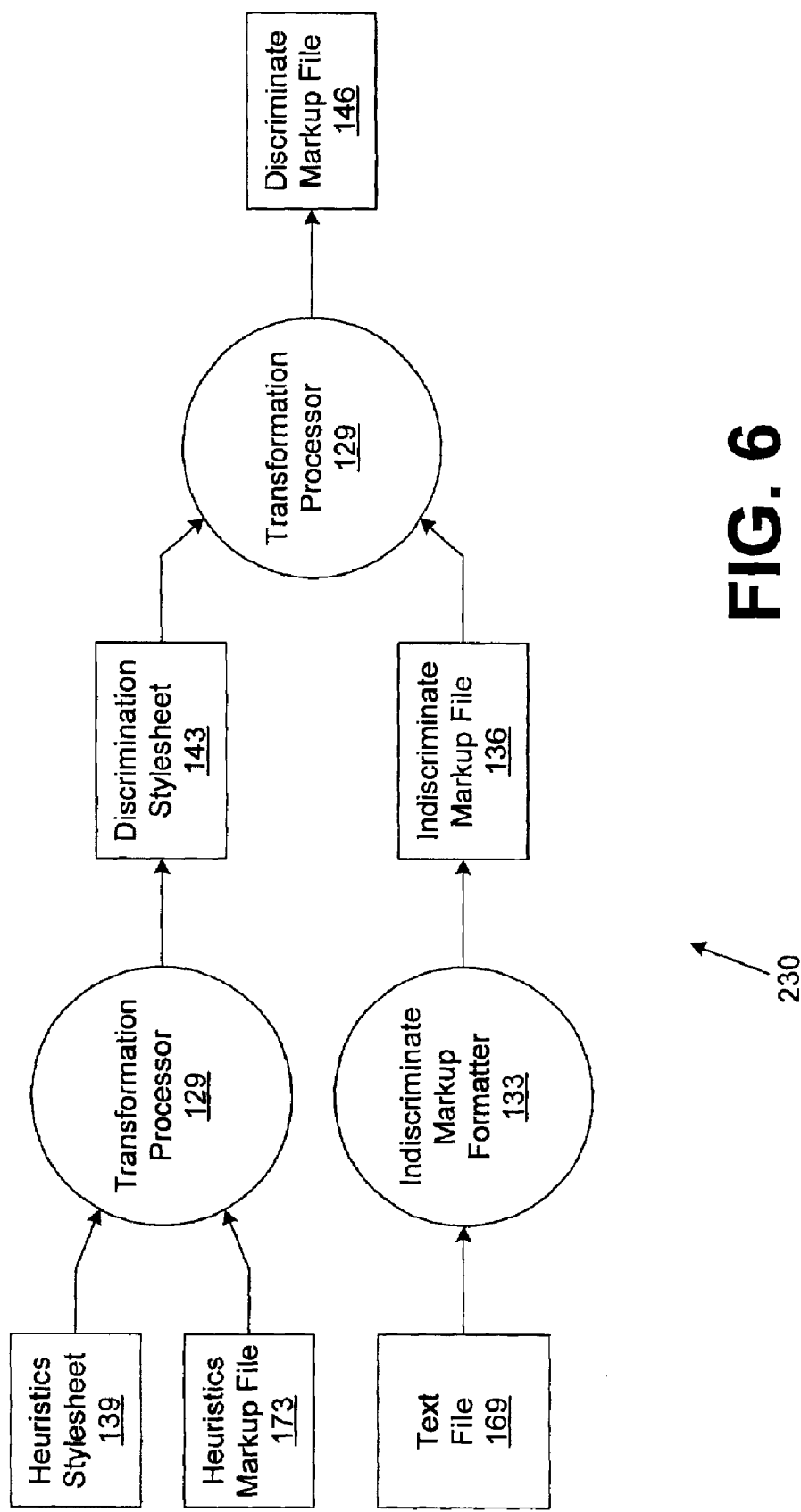
FIG. 6 is a functional block diagram that illustrates a first approach employed in the transformation of a text file of FIG. 2 into the discriminate markup file of FIG. 3 using the content formatting server of FIG. 1 according to an aspect of the present invention.

In light of the forgoing, the present invention provides for a system and a method to format a content item into a predefined markup format. For example, the present invention provides various embodiments to transform a content item embodied in a text file into a discriminate markup file such as an Extensible Markup Language (XML) file that includes metadata such as tags that differentiate among the various content element in the content item.

In this respect, in one embodiment a formatting system is provided that includes a processor circuit having a processor and a memory. The formatting system also includes a content item embodied in a text file stored in the memory and formatting logic stored in the memory and executable by the processor. The formatting logic comprises logic that converts the content item embodied in the text file into an indiscriminate markup file, and, logic that transforms the content item embodied in the indiscriminate markup file into a discriminate markup file, the discriminate markup file including a number of discriminating tags that are associated with a number of content elements.

In another embodiment, the present invention provides for a program embodied on a computer readable medium to format a content item. In this respect, the program comprises code that converts the content item embodied in a text file into an indiscriminate markup file, and, code that transforms the content item embodied in the indiscriminate markup file into a discriminate markup file, the discriminate markup file including a number of discriminating tags that are associated with a number of content elements.

In addition, the present invention may be viewed as a method to format a content item. In this respect, the method comprises the steps of converting the content item embodied in a text file into an indiscriminate markup file in at least one processor based system, and, transforming the content item embodied in the indiscriminate markup file into a discriminate markup file in the at least one processor based system, the discriminate markup file including a number of discriminating tags that are associated with a number of content elements.

With reference to FIG. 1, shown is a client/server network 100 according to an aspect of the present invention. The client/server network 100 includes a content formatting server 103 and a client 106, both of which are coupled to a network 109. Before a detailed description of the operation of the client/server network 100 is provided, a discussion of the physical make up of the client/server network 100 is provided.

The content formatting server 103 includes a processor 113 and a memory 116, both of which are coupled to a local interface 119. The local interface 119 may be, for example, a data bus with an accompanying control/address bus as is generally known by those with ordinary skill in the art. In this respect, the processor 113, memory 116, and the local interface 119 generally comprise a processor circuit as may be found, for example, in computer systems or other like systems.

Stored on the memory 116 and executable by the processor 113 are several components. These components include an operating system 123, a transform controller 126, a transformation processor 129, and an indiscriminate markup formatter 133. Also stored on the memory 116 are several files that are manipulated by the transform controller 126, transformation processor 129, and the indiscriminate markup formatter 133 as will be discussed. These files include an indiscriminate markup file 136, a heuristics stylesheet 139, a discrimination stylesheet 143, and a discriminate markup file 146. The transformation processor 129 may be, for example, an extensible stylesheet language transform (XSLT) processor or other like processor as is generally known by those with ordinary skill in the art. The specific operation of the transform controller 126, transformation processor 129, and the indiscriminate markup formatter 133 is discussed in later text.

The client 106 also includes a processor circuit with a processor 153, a memory 156, and a local interface 159. The local interface 159 may be, for example, a data bus with an accompanying control/address bus as is generally known by those with ordinary skill in the art. The processor circuit of the client 106 may be similar to those found in computer systems or other systems with suitable capability. In this respect, stored on the memory 156 and executable by the processor 153 are an operating system 163, and a client application 166. Also stored on the client 106 are a text file 169 and a heuristics markup file 173.

The network 109 includes, for example, the Internet, wide area networks (WANs), local area networks (LANs), or other suitable networks, etc., or any combination of two or more such networks. The content formatting server 103 and the client 106 may each include a number of peripheral devices including user input devices such as, for example, a keypad, touch pad, touch screen, microphone, scanner, mouse, joystick, or one or more push buttons, etc. The peripheral devices may also include user output devices such as, for example, display devices, indicator lights, speakers, printers, etc. Specific display devices may be, for example, cathode ray tubes (CRTs), liquid crystal display screens, gas plasma-based flat panel displays, light emitting diodes, etc.

Each of the memories 116 and 156 may include both volatile and nonvolatile memory components. Volatile components are those that do not retain data values upon loss of power. Nonvolatile components are those that retain data upon a loss of power. Thus, each of the memories 116 and 156 may comprise, for example, random access memory (RAM), read-only memory (ROM), hard disk drives, floppy disks accessed via an associated floppy disk drive, compact disks accessed via a compact disk drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other such of memory device.

Also, each of the processors 113 and 153 may represent multiple processors and each of the memories 116 and 156 may represent multiple memories that operate in parallel processing circuits, respectively. In such a case, the local interfaces 119 and 159 may be an appropriate network that facilitates communication between any two of the multiple processors or between any processor and any of the memories, etc. The local interfaces 119 and 159 may facilitate memory to memory communication as well. The processors 113 and 153 may be electrical or optical in nature or other physical configuration.

The operating systems 123 and 163 are executed to control the allocation and usage of hardware resources in the content formatting server 103 and the client 106, respectively. Specifically, the operating systems 123 and 163 control the allocation and usage of the memories 116 and 156, and the allocation and usage of processing time as well as performing other functionality as is generally known by those with ordinary skill in the art. In this manner, the operating systems 123 and 163 serve as the foundation on which applications depend as is generally known by those with ordinary skill in the art.

Turning then to FIG. 2 shown is a drawing of a text file 169 according to an aspect of the present invention. The text file 169 embodies a content item 183. The content item 183 includes a number of content elements 186. The content item 183 may be, for example, an article in a magazine or a newspaper. Note, however, that the content item 183 may be any expression embodied within text as is generally known by those with ordinary skill in the art. Thus, in the context of the publishing world, the content item 183 may be an article that includes various content elements 186 such as the title, author, release date, article body, and other elements distinguishable in a similar manner.

Referring then to FIG. 3, shown is the discriminate markup file 146 according to an aspect of the present invention. The discriminate markup file 146 includes the content item 183 with the content elements 186 being surrounded or indicated by various discriminating tags 189. Thus the discriminate markup file 146 may be created using Extensible Markup Language (XML) or other appropriate markup language. In this respect, the discriminate markup file 146 may be formatted according to a particular data type document (DTD) or other format. Thus, the discriminate markup file 146 embodies the content item 183 in a markup format that provides metadata relating to the data within the content item 183 itself. This is advantageous in that some other application on either the client 106 or the content formatting server 103, or some other system connected to network 109 (FIG. 1), can process the discriminate markup file 146 as it includes all of the content elements 186 therein in a format that is recognizable by standard software tools or other processing tools, such as an Extensible Markup Language (XML) parser or an Extensible Stylesheet Language Transformation (XSLT) processor as is generally known by those with ordinary skill in the art.

Turning then to FIG. 4, shown is the indiscriminate markup file 136 according to an aspect of the present invention. The indiscriminate markup file 136 includes a number of content elements 186 that are nested between a set of indiscriminate tags 193. In this sense, the indiscriminate markup file 136 embodies the content item 183 in a manner that does not discriminate or otherwise indicate the nature of the content elements 186 with a set of discriminating tags 189 (FIG. 3). Thus the indiscriminate markup file 136 provides no metadata relating to the content elements 186. The indiscriminate markup file 136 provides an intermediate format in which the content item 183 is embodied to perform the transformation from the text file 169 (FIG. 2) into the discriminate markup file 146 (FIG. 3) as will be discussed.

With reference to FIG. 5, shown is an example of the heuristics markup file 173 according to an aspect of the present invention. The heuristics markup file 173 may be created using Extensible Markup Language (XML) or other markup language. The heuristics markup file 173 provides a relative position within the text file 169 (FIG. 2) and, correspondingly, within the indiscriminate markup file 136 (FIG. 4) of each of the content elements 186. Specifically, the heuristics markup file 173 includes a number of data type tags 196 that are associated with a respective content element 186 (FIG. 4) in both the text file 169 and in the indiscriminate markup file 136. Associated with each of the data type tags 196 is a line indicator 199 that indicates which line in both the text file 169 and, therefore, the indiscriminate markup file 136 that the associated content element 186 may be found. Since each content element 186 in the indiscriminate markup file 136 corresponds to an actual line from the text file 169, the heuristics markup file 173 ultimately maps the content elements 186 from the text file 169 and the indiscriminate markup file 136 to the content elements 186 in the discriminate markup file 146 (FIG. 3).

Referring back to FIG. 1, a general explanation of the operation of the client/server network 100 in the context of a specific example is provided to illustrate the use of the present invention. To begin, a user of the client 106 generates a content item 183 such as publishing content that is embodied in the form of the text file 169. For example, the text file 169 may embody a newspaper article that was generated by the client application 166. Unfortunately, the text file 169 does not conform to the NITF as is generally known by those with ordinary skill in the art. If the text file 169 is embodied in a markup format such as XML, etc., then a transformation of the content of the text file 169 into the NITF might be performed using a transformation processor 129 and an appropriate stylesheet in the client 106.

However, the average user may not have the technical expertise to generate the proper stylesheet, etc., to effect the transformation. In addition, the step of embodying the text file 169 in a markup format may prove to be tedious, especially where many text files 169 are involved, as is typically the case with publishers who share content.

To address these problems, according to the present invention, the user generates a simple heuristics markup file 173 that describes the relative position of various content elements 186 included in the text file 169. Such information may be, for example, the byline, dateline, title, article text, and other information. Both the text file 169 and the heuristics markup file 173 are provided to the content formatting server 103. Note where multiple text files 169 use the same format or layout, a single heuristics markup file 173 may be created for all of the text files 169. In such case, a unique identifier may be included in the heuristics markup file 173 and the respective text files 169 so that they can be associated with each other in the content formatting server 103.

The content formatting server 103 executes the transform controller 126, transformation processor 129, and the indiscriminate markup formatter 133 to transform the text file 169 into a discriminate markup file 146. The discriminate markup file 146 may be, for example, a markup file that conforms to the NITF. The term "discriminate" is used to describe the discriminate markup file 146 as it refers to the fact that the metadata or tags in the discriminate markup file 146 designates the nature or type of information associated therewith. Once the discriminate markup file 146 is created, then it may be transmitted back to the client 106 via the network 109 or to some other entity on the network 109.

The present invention provides several advantages. For example, the user of the client 106 need not be skilled in the creation of stylesheets so as to create the stylesheets necessary to transform the text file 169 into the discriminate markup file 146. Also, the user need not transform the text file 169 into the indiscriminate markup file 136 for further processing. All the user need do is create the simple heuristics markup file 173 that describes the relative location of the content elements 186 (FIG. 4) in the text file 169. In the case that multiple text files 169 are created using a similar format, then only one such heuristics markup file 173 need be created for the multiple text files 169.

Turning then to FIG. 6, shown is a functional block diagram of a specific approach 230 to transform the text file 169 into a discriminate markup file 146 in the content formatting server 103 according to one embodiment of the present invention. According to the approach 230, the text file 169 is applied to the indiscriminate markup formatter 133 that transforms the text file 169 into the indiscriminate markup file 136. Specifically, the indiscriminate markup formatter 133 reformats the content item 183 (FIG. 2) embodied in the text file 169 into the indiscriminate markup file 136 (FIG. 4) with the indiscriminate tags 193 included therein.

The heuristics stylesheet 139 and the heuristics markup file 173 are applied to the transformation processor 129 to generate the discrimination stylesheet 143. In this respect, the transformation processor 129 may be, for example, an extensible stylesheet language transform (XSLT) processor as is generally known by those with ordinary skill in the art. Thereafter, the discrimination stylesheet 143 and the indiscriminate markup file 136 are applied to the transformation processor 129 that ultimately generates the discriminate markup file 146. An example of the heuristics stylesheet 139 is provided in Appendix A and an example of the discrimination stylesheet 143 is provided in Appendix B.

The heuristics markup file 173 includes the relative positions of all the content elements 186 (FIG. 4) within the indiscriminate markup file 136 (FIG. 4). The discrimination stylesheet 143 includes instructions to obtain the content elements 186 from the various locations in the indiscriminate markup file 136 and place them in appropriate locations in the discriminate markup file 146 commensurate with the discriminating tags 189 (FIG. 3) that are contained therein. In this manner, the discriminate markup file 146 is generated and the content item 183 (FIG. 3) is expressed in the format that may be accessed by compatible applications. For example, the discriminate markup file 146 may conform to the NITF for use by publishers, etc.

Figure 7:
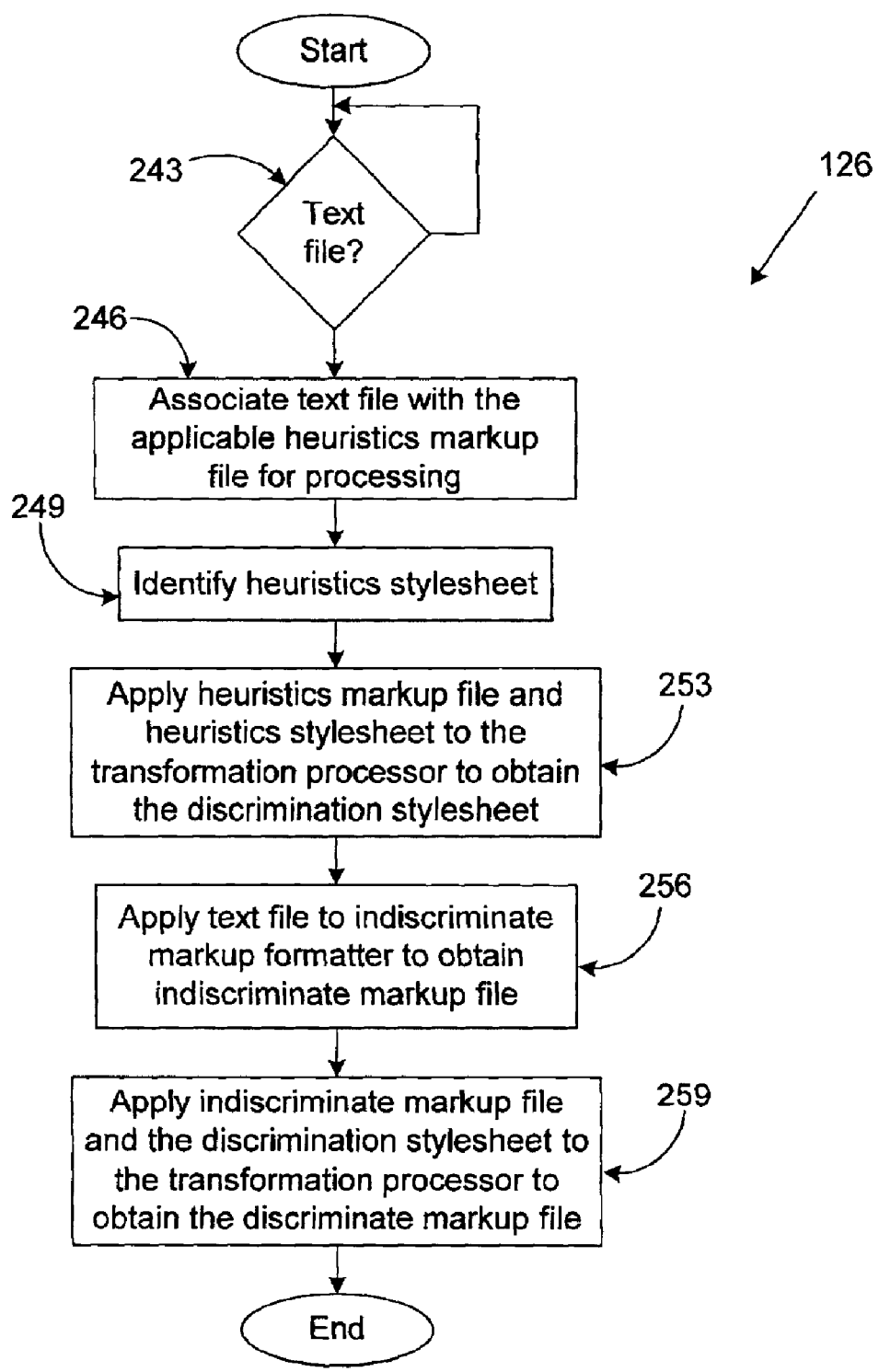
FIG. 7 is a flow chart of a first embodiment of a transform controller stored and executed in the content formatting server of FIG. 1 to perform the transformation illustrated in FIG. 6.

Referring next to FIG. 7, shown is a flow chart of the transform controller 126 that is employed to transform the text file 169 (FIG. 6) into the discriminate markup file 146 (FIG. 6) according to an aspect of the present invention. Alternatively, the flow chart of FIG. 7 may be viewed as depicting the steps in a method to transform the text file 169 into the discriminate markup file 146. Beginning with block 243, the transform controller 126 determines whether a text file 169 and accompanying heuristics markup file 173 (FIG. 6) have been received from a client 106 (FIG. 1) requiring transformation into the discriminate markup file 146. Alternatively, the accompanying heuristics markup file 173 may be stored in the memory 116 (FIG. 1) of the content formatting server 103 (FIG. 1) from a prior transaction. If such is the case then the transform controller 126 proceeds to block 246 in which the text file 169 (FIG. 2) is associated with the applicable heuristics markup file 173 (FIG. 5). This association may be made in the case that the heuristics markup file 173 is stored in the memory 116 of the content formatting server 103 and includes a field that provides unique identification of the particular heuristics markup file 173 itself. Likewise, the text file 169 may also include the same designation in order to make possible an association between the text file 169 and the heuristics markup file 173. Thereafter, in block 249 the appropriate heuristic stylesheet 139 (FIG. 6) is identified so as to enable processing of the text file 169 in light of the heuristics markup file 173.

Thereafter, in block 253 the heuristics markup file 173 and the heuristics stylesheet 139 are applied to the transformation processor 129 to obtain the discrimination stylesheet 143. Next, in block 256, the text file 169 is applied to the indiscriminate markup formatter 133 (FIG. 6) in order to obtain the indiscriminate markup file 136. Then, in block 259 the discrimination stylesheet 143 and the indiscriminate markup file 136 are applied to the transformation processor 129 that generates the discriminate markup file 146. In this manner the transform controller 126 controls the transformation of the text file 169 into the discriminate markup file 146 by employing the transformation processor 129 and the indiscriminate markup formatter 133 at appropriate times as discussed.

Figure 8:
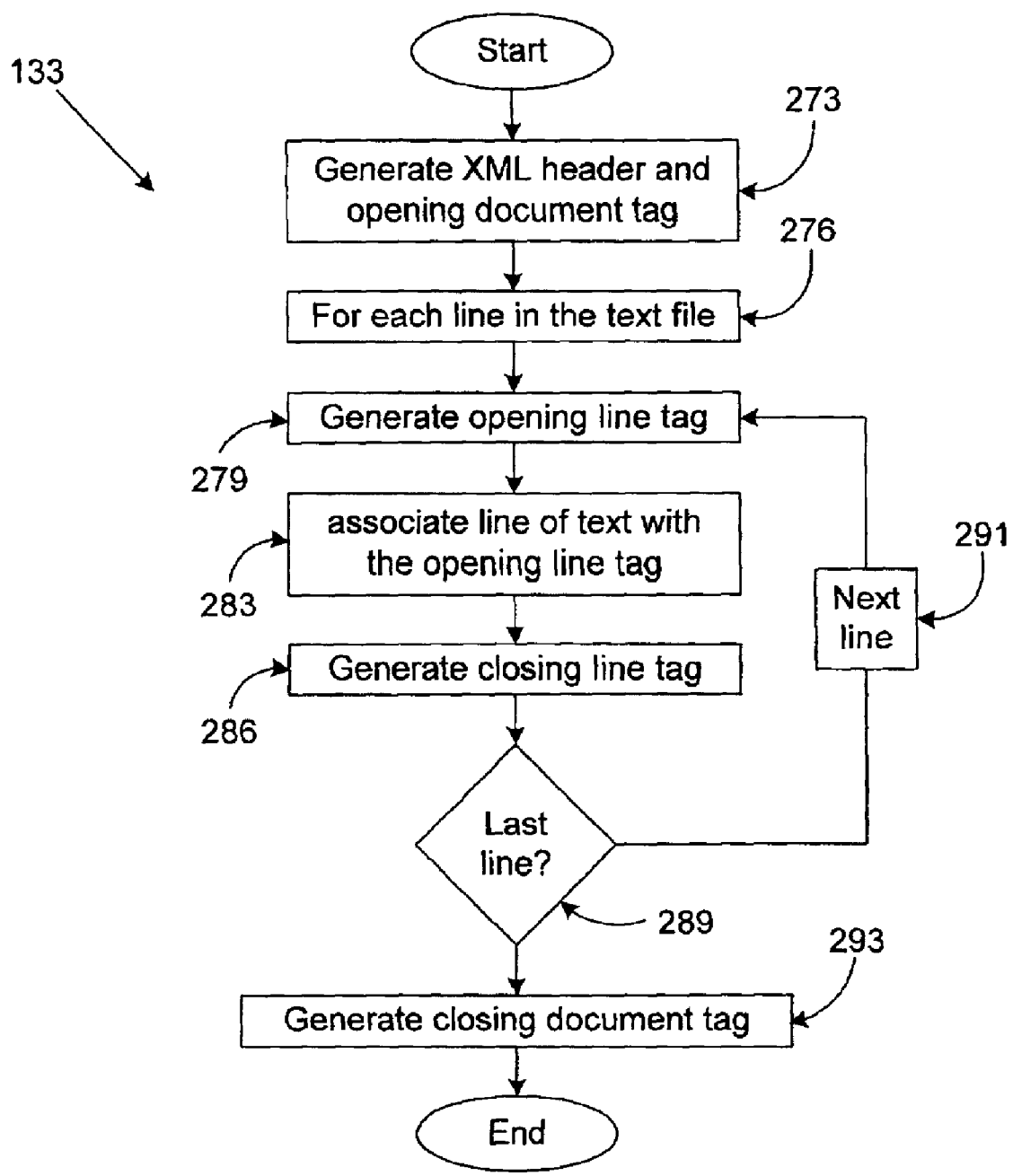
FIG. 8 is a flow chart of an indiscriminate markup formatter stored and executed in the content formatting server of FIG. 1 that is employed in the transformation illustrated in FIG. 6.

With reference then to FIG. 8, shown is a flow chart of the indiscriminate markup formatter 133 according to an aspect of the present invention. Alternatively, the flow chart of FIG. 8 may be viewed as depicting steps of a method implemented in the content formatting server 103. The indiscriminate markup formatter 133 is executed in the content formatting server 103 (FIG. 1) in order to transform the content item 183 that is embodied in the form of the text file 169 into the indiscriminate markup file 136 with the indiscriminate tags 193. This is done so that the content item is embodied in a format that may be processed using the transformation processor 129 (FIG. 6).

Beginning with block 273, the indiscriminate markup formatter 133 generates a header and/or opening document tag such as an XML header as is generally known by those with ordinary skill in the art. Such is created as a portion of the indiscriminate markup file 136 as is demanded by the particular standard or language employed whether it be XML, HTML, or other markup language. Also, an opening document tag is created to indicate the beginning of the document in the indiscriminate markup file 136. Then, in block 276, a loop is commenced for each line in the text file 169 (FIG. 2). Thereafter, in block 279 an opening indiscriminate tag 193 is written to the indiscriminate markup file 136 for the current line in the text file 169.

The indiscriminate markup formatter 133 then proceeds to block 283 in which the line of text in the text file 169 is associated with the opening indiscriminate tag 193 in the indiscriminate markup file 136 by writing the line of text thereto. Thereafter in block 286, the indiscriminate markup formatter 133 generates a closing indiscriminate tag 193 and writes the same to the indiscriminate markup file 136 for the current line of text included therein. Then, in block 289 the indiscriminate markup formatter 133 determines whether the last line of text in the text file 169 has been included in the indiscriminate markup file 136. If not, then the indiscriminate markup formatter 133 moves to block 291 in which the next line of text in the text file 169 is identified to be placed in the indiscriminate markup file 136. Thereafter, the indiscriminate markup formatter 133 reverts back to block 279 as shown.

On the other hand, if in block 289 the last line of the text file 169 has been processed then the indiscriminate markup formatter 133 proceeds to block 293 in which a closing document tag corresponding with the opening document tag in the indiscriminate markup file 136 is written thereto. Thereafter the indiscriminate markup formatter 133 ends accordingly.

Although the transform controller 126 (FIG. 7), transformation processor 129 (FIG. 1), and/or the indiscriminate markup formatter 133 (FIG. 8) of the present invention are embodied in software or code executed by general purpose hardware as discussed above, as an alternative the transform controller 126, transformation processor 129, and/or the indiscriminate markup formatter 133 may also be embodied in dedicated hardware or a combination of software/general purpose hardware and dedicated hardware. If embodied in dedicated hardware, the transform controller 126, transformation processor 129, and/or the indiscriminate markup formatter 133 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The functional block diagram of FIG. 6 and/or the flow charts of FIGS. 7 and 8 show the architecture, functionality, and operation of an implementation of the transform controller 126, transformation processor 129, and/or the indiscriminate markup formatter 133. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the functional block diagram of FIG. 6 and/or the flow charts of FIGS. 7 and 8 show a specific order of execution, it is understood that the order of execution may differ from that which is depicted. For example, the order of execution of two or more blocks may be scrambled relative to the order shown. Also, two or more blocks shown in succession in FIGS. 7 or 8 may be executed concurrently or with partial concurrence. In addition, any number of counters, state variables, warning semophores, or messages might be added to the logical flow described herein, for purposes of enhanced usability, accounting, performance measurement, or providing troubleshooting aids, etc. It is understood that all such variations are within the scope of the present invention. Also, the functional block diagram of FIG. 6 and/or the flow charts of FIGS. 7 and 8 are relatively self-explanatory and are understood by those with ordinary skill in the art to the extent that software and/or hardware can be created by one with ordinary skill in the art to carry out the various logical functions as described herein.

Also, where the transform controller 126, transformation processor 129, and/or the indiscriminate markup formatter 133 comprise software or code, each can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the transform controller 126, transformation processor 129, and/or the indiscriminate markup formatter 133 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

What is claimed is:

1. A method to format a content item, comprising:
    converting the content item embodied in a text file into an indiscriminate markup file in at least one processor based system;
    transforming the content item embodied in the indiscriminate markup file into a discriminate markup file in the at least one processor based system, the discriminate markup file including a number of discriminating tags that are associated with a number of content elements, wherein the step of transforming the content item embodied in the indiscriminate markup file into the discriminate markup file further comprises:
        providing a discrimination stylesheet that includes a set of discrimination instructions to transform the indiscriminate markup file into the discriminate markup file;
        applying the discrimination stylesheet and the indiscriminate markup file to a transformation processor, thereby implementing the set of discrimination instructions; and
    wherein the step of providing the discrimination stylesheet further comprises:
        providing a heuristics markup file that sets forth a relative position of the content elements of the content item embodied in the indiscriminate markup file;
        providing a heuristics stylesheet that sets forth a set of heuristic instructions to translate the heuristics markup file into the discrimination stylesheet; and
        applying the heuristics markup file and the heuristics stylesheet to a transformation processor to generate the discrimination stylesheet.

2. The method of claim 1, wherein the step of providing a discrimination stylesheet that includes a set of discrimination instructions to transform the indiscriminate markup file into the discriminate markup file further comprises providing the set of discrimination instructions to write each of the number of content elements in the indiscriminate markup file into the discriminate markup file with a pair of associated discriminating tags.

3. The method of claim 1, further comprising the step of associating the heuristics markup file with the text file.

4. The method of claim 1, wherein each of the pairs of the indiscriminate tags are the same.

5. A program embodied on a computer readable medium to format a content item, comprising:
    code that converts the content item embodied in a text file into an indiscriminate markup file; and
    code that transforms the content item embodied in the indiscriminate markup file into a discriminate markup file, the discriminate markup file including a number of discriminating tags that are associated with a number of content elements, wherein the code that transforms the content item embodied in the indiscriminate markup file into the discriminate markup file further comprises;
    a transformation processor;
    code that applies a discrimination stylesheet and the indiscriminate markup file to the transformation processor, the discrimination stylesheet including a set of discrimination instructions to transform the indiscriminate markup file into the discriminate markup file; and
    code that applies a heuristics markup file and a heuristics stylesheet to the transformation processor to generate the discrimination stylesheet, wherein the heuristics markup file sets forth a relative position of the content elements of the content item embodied in the indiscriminate markup file, and, the heuristics stylesheet sets forth a set of heuristics instructions to transform the heuristics markup file into the discrimination stylesheet.

6. The program embodied on a computer readable medium of claim 5, wherein the set of discrimination instructions further comprises a number of instructions that write each of the number of content elements in the indiscriminate markup file into the discriminate markup file with a pair of associated discriminating tags.

7. The program embodied on a computer readable medium of claim 5, wherein the code that transforms the content item embodied in the indiscriminate markup file into the discriminate markup file further comprises code that associates the heuristics markup file with the text file.

8. The program embodied on a computer readable medium of claim 5, wherein each of the pairs of the indiscriminate tags are the same.

9. A formatting system, comprising:

a processor circuit having a processor and a memory;

a content item embodied in a text file stored in the memory;

formatting logic stored in the memory and executable by the processor, the formatting logic comprising:

logic that converts the content item embodied in the text file into an indiscriminate markup file; and logic that transforms the content item embodied in the indiscriminate markup file into a discriminate markup file, the discriminate markup file including a number of discriminating tags that are associated with a number of content elements, wherein the logic that transforms the content item embodied in the indiscriminate markup file into the discriminate markup file further comprises:

a transformation processor; and logic that applies a discrimination stylesheet and the indiscriminate markup file to the transformation processor, the discrimination stylesheet including a set of discrimination instructions to transform the indiscriminate markup file into the discriminate markup file;

a heuristics markup file stored in the memory, the heuristics markup file setting forth a relative position of the content elements of the content item embodied in the indiscriminate markup file;

a heuristics stylesheet stored in the memory, the heuristics stylesheet setting forth a set of heuristics instructions to transform the heuristics markup file into the discrimination stylesheet; and wherein the formatting logic further comprises logic that applies the heuristics markup file and the heuristics stylesheet to the transformation processor to generate the discrimination stylesheet.

10. The formatting system of claim 9, wherein each of the pairs of the indiscriminate tags are the same.

* * * * *